United States Patent [19]

Viaud

[11] Patent Number: 4,821,637

[45] Date of Patent: Apr. 18, 1989

[54] SUPPORT ASSEMBLY ATTACHED TO A LARGE ROUND BALER FOR FORMING A BALE DISCHARGE RAMP

[75] Inventor: Jean Viaud, Sarrequemines, France

[73] Assignee: Deere & Comapny, Moline, Ill.

[21] Appl. No.: 185,652

[22] Filed: Apr. 25, 1988

[30] Foreign Application Priority Data

Apr. 27, 1987 [GB] United Kingdom ............... 8709927

[51] Int. Cl.⁴ .................................. B30B 5/06
[52] U.S. Cl. .......................... 100/88; 56/341
[58] Field of Search ..................... 100/88, 89; 56/341-344

[56] References Cited

U.S. PATENT DOCUMENTS 4,470,247 9/1984 Mast ........................................ 100/88
4,566,380 1/1986 Clostermeyer et al. ............. 100/89
4,770,093 9/1988 Gunther et al. ..................... 100/88

Primary Examiner—Peter Feldman

[57] ABSTRACT

A baling machine for forming large cylindrical bales of hay has a gate which can be raised to enable a campleted bale to pass under it for discharge. The bale initially rests on a horizontal support which is biased by a compression spring to swing to a discharge position in which it forms a ramp down which the bale rolls onto the ground. The support is maintained in the horizontal position by a abutment bar on the gate during the time that the gate is closed, but is released on the gate opening. In this way energy from the bale is not used for swinging the ramp, so the bale tends to roll further so that it is properly clear of the gate so as not to interfere with the closing of the gate.

4 Claims, 2 Drawing Sheets

SUPPORT ASSEMBLY ATTACHED TO A LARGE ROUND BALER FOR FORMING A BALE DISCHARGE RAMP

BACKGROUND OF THE INVENTION

The present invention relates to a baling machine for forming cylindrical bales of crop and more particularly relates to a support assembly for forming a discharge ramp for such a machine.

Machines, towed by a tractor, for forming large cylindrical bales of hay (so called "round balers") are well-known. As the machine advances, the crop is removed from a windrow by a pickup mechanism and delivered rearwardly to a baling chamber where it is rolled into a bale.

There are basically two forms of such machines, namely those with a fixed volume baling chamber defined by driven fixed-position rolls and those with a baling chamber defined by runs of driven belts which move outwardly to enlarge the chamber to accommodate the bale as it grows in size. In both forms the hay is caused by the driven movement of the rolls or belts to toll around upon itself into a core and the core rotates about its horizontal axis and finally a completed bale is formed, the chamber being fed throughout with hay. The completed bale is tied with twine to maintain its shape and is discharged by rolling through a gate formed by a rear portion of the machine.

The gate is swingable about a horizontal pivot axis located at the top of the baler so that the gate moves rearwardly and upwardly from a closed position in which it is approximately vertical to a fully open position at an angle of about sixty degrees to the vertical at which the completed bale can pass freely under it.

It is generally known to provide a support, for the bale, which can be swung against a spring loading to a ramp position to enable the bale to roll down it onto the ground at discharge. However, there is sometimes a tendency for the bale not to roll sufficiently away from the gate on reaching the ground. In these circumstances, if it is attempted to close the gate it will foul the bale lying below it, and so the baler has to be maneuvered to clear this obstruction before the gate can successfully be shut with consequent loss of time in the harvesting operation.

In GB-A No. 2 138 354 it has been proposed to provide a horizontal grid, supporting the bale, which is triggered to move against a spring loading to a downwardly inclined position immediately when opening of the gate has started. After discharge, an automatic signal indicates to the driver whether the bale is clear of the gate swing area. The grid extends far beyond the rear of the machine when the gate is closed so that the bale would probably be deposited sufficiently clear of the gate generally to enable closure without fouling. However, this adds significantly to the overall length of the machine.

Each of co-pending U.S. application Ser. No. 089,282 filed on Aug. 25, 1987 and U.S. application Ser. No. 108,329 filed on Oct. 14, 1987 disclose a support assembly somewhat like that of the aforementioned GB-A No. 2 138 354 but having a support member that does not extend beyond the rear of the closed gate and has its lowering controlled by a cable attached to the discharge gate. While the support assemblies disclosed in these applications operate satisfactorily they require rather strong springs which serve to give a discharged bale a "kick" to ensure that it moves beyond the opened gate a distance sufficient for the bale to close.

The present invention reduces or eliminates the problem of insufficient rolling of the bale from the gate, without the necessity for increasing the length of the machine or the necessity for providing relatively strong biasing springs, by a very simple design.

SUMMARY OF THE INVENTION

According to the present invention a baling machine for forming cylindrical bales of crop has a gate which can be raised to open it to allow a completed bale to be discharged through the opening and a support for the completed bale which is swingable between a non-discharge position and a discharge position at which it forms a ramp down which the bale can roll to the ground, and the support is biased toward the discharge position, is maintained in the non-discharge position against the bias by the gate, and is released to the discharge position on opening of the gate.

The gate preferably has an abutment which, when the gate is closed, contacts the support so as to prevent the support from swinging under its bias away from the non-discharge position, when the gate opens, moves out of contact with the support so as to release it, and when the gate closes, engages the support and returns it to its non-discharge position.

The bias can be provided by a compression spring or springs.

BRIEF DESCRIPTION OF THE DRAWINGS

An embodiment of a machine according to the present invention will now be described with reference to the accompanying diagrammatic drawings in which.

DESCRIPTION OF THE PREFERRED EMBODIMENT

Figure 1:
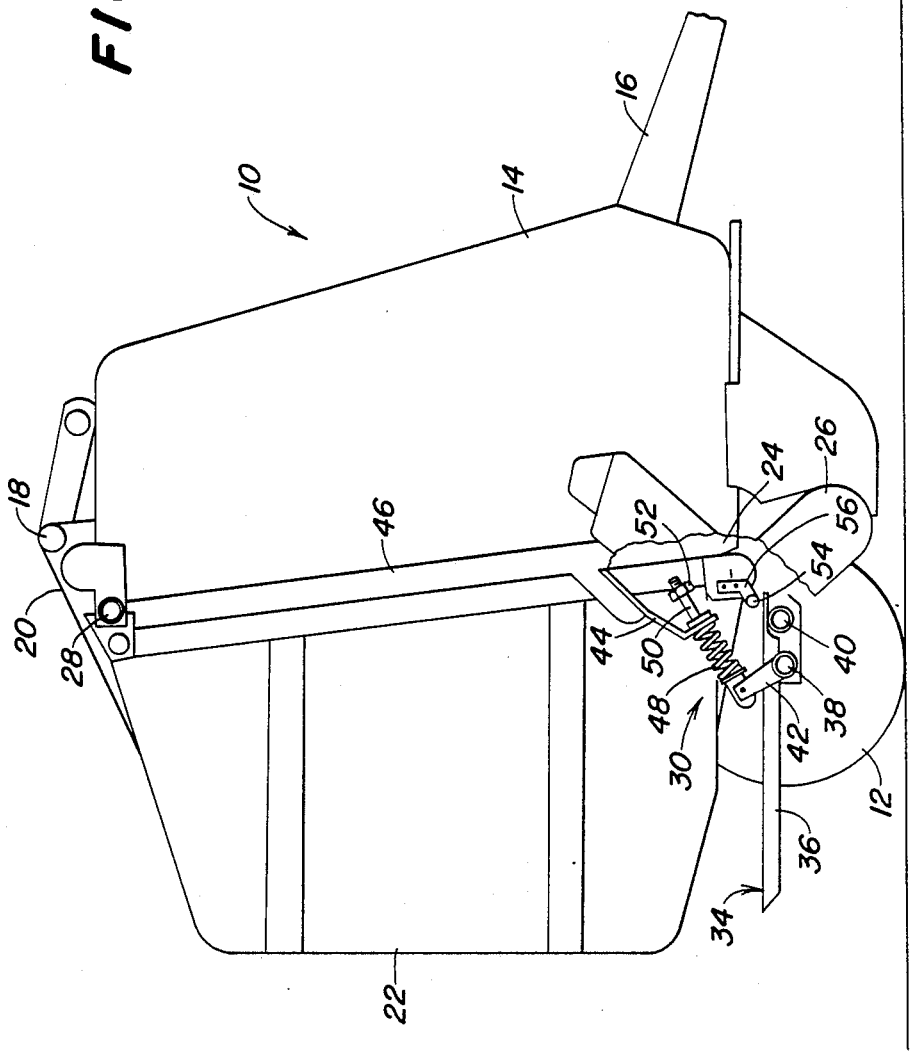
FIG. 1 is an elevational view from the right of a round baler for forming large cylindrical bales of hay showing a portion broken away to reveal details of an arrangement for discharging a bale clear of the machine.

In the drawings, the baler includes a main frame 10 mounted on a pair of wheels of which only the left hand wheel 12 is shown. The main frame has an upright fore-and-aft extending wall 14 on either side connected by transverse beams (not shown). A draft tongue 16 is connected to a transverse beam at the front of the frame 10 and extends forwardly for attaching the baler to a tractor which draws the machine.

Mainly within the machine (and therefore masked from view in the drawings) a plurality of lateral rolls, e.g. roll 18, extends over its width carrying belts 20 which define an expanding bale-forming chamber the ends of which are provided by the sidewalls 14 and a rear gate 22 and which has an inlet 24 for crop received from a pick-up 26 beneath it. The gate 22 is swingable upwardly and rearwardly from its closed position in FIG. 1 about a pivot axis 28 at the top of the machine to its open position in FIG. 2.

As described thus far the baler is conventional.

Figure 2:
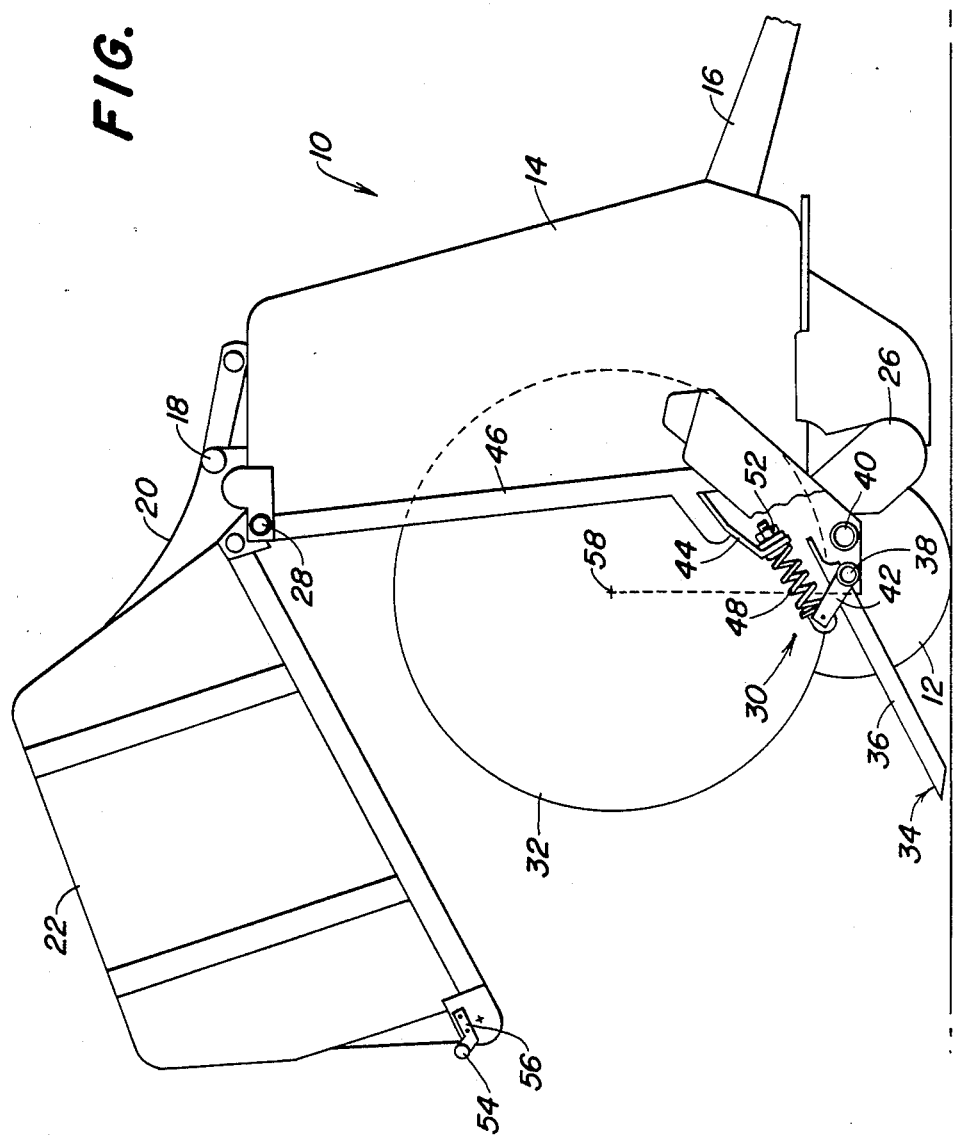
FIG. 2 shows the machine of FIG. 1, also from the right, in the bale discharge configuration.

A support assembly 30 is provided for a completed bale 32 as shown in FIG. 2. This assembly includes a normally horizontal support 34 located below the closed gate 22 and, hence, the rearward portion of the bale-forming chamber, when at its maximum size for the completed bale 32, and located just above the level of the axle of wheel 12. The support 34 has two longitudinal side beams 36, only the right hand one being shown, and extends rearwardly but does not protrude beyond the back of the gate 22 so the support 34 is contained well within the confines of the rest of the machine. The support 34 is pivotally mounted at a position towards its forward end by way of a horizontal shaft 38 with which it is rigid. Its forward end abuts, when in the horizontal position of FIG. 1, a stop bar 40 below it. It is not necessary for the support 34 to be exactly horizontal in the FIG. 1 position, and if desired, it may have some rearwardly directed downward slope of, for example, ten degrees.

The following details apply to both sides of the machine, although for clarity only one side will be considered.

A lever 42, rigid with the horizontal shaft 38, is disposed outwardly of the side beam 36 and extends upwardly and rearwardly. A bracket 44 is attached to an upright beam 46, in front of the gate 22, of the sidewall 14, and an adjustable compression spring 48 is mounted on a rod 50 pivotally connected to the upper end of the lever 42 and received through the bracket 44 so that it strongly urges the support 34 downwardly in an anticlockwise direction. An adjustment nut 52 is engaged on the upper end of the rod 50. Opposed to this spring bias is an abutment bar 54 which extends over the width of the machine in contact with the forward end of the support 34 and is rigid with a leg 56 (on both sides of the machine) bolted to a forward lower portion of the gate 22.

In operation, after the completed bale 32 has been formed and tied with twine the gate 22 is opened. The center 58 of the bale initially overlies a point on the support 34 just to the rear of the horizontal shaft 38. On opening of the gate 22, the abutment bar 54 will, of course, move rearwardly and upwardly so that it rapidly moves out of contact with the support 34 enabling the latter to be thrust downwardly immediately by the loading of the springs 48 on either side of the machine.

Unlike known machines having a bale support which is biased against downward movement and toward a horizontal non-discharge position, the present baler is designed so that energy from the bale 32 is not used in overcoming the bias 48 of the support 34, and therefore the bale, when it reaches the ground, tends to roll further away from the support 34 and consequently is less likely to be in a position where it will obstruct the gate 22 on closure. It is the closing of the gate 22 which imparts energy to the arrangement 30 for future unloading movement of the support 34 in that, as the gate 22 returns to its closed position, the abutment bar 54 contacts the forward end portion of the support 34 swinging it clockwise to restore it to the horizontal non-discharge position and to compress the springs 48.

I claim:

1. In a baling machine for forming cylindrical bales of crop including a bale chamber defined in part by a bale discharge gate pivotable about an upper front location thereof between a lowered closed position wherein it closes the chamber and a raised open position wherein it allows a completed bale to exit the chamber, a support extending beneath the bale discharge gate and being vertically pivotally mounted for movement between an elevated non-discharge position and a lowered discharge position where it forms a ramp for the bale to roll down, the improvement comprising: biasing means loaded against the support and urging the support towards its discharge position and abutment means carried by a lower front portion of the gate and being engaged with the support for holding the latter in its non-discharge position when the gate is in its closed position; and the abutment means being so located relative to the support than when the gate moves towards its open position, the abutment means will move away from the support so as to permit the biasing means to move the support to its discharge position and that when the gate moves towards its closed position the abutment means will re-engage the support and return it to its non-discharge position.

2. A baling machine according to claim 1 in which the biasing means includes at least one compression spring.

3. A baling machine according to claim 2 in which said at least one compression spring is adjustable.

4. A baling machine according to claim 2 in which the support is rigidly attached to a horizontal pivot shaft ;a lever being fixed to the shaft for pivoting therewith; and the lever being coupled to and loaded by said at least one compression spring.

* * * * *